US008485425B2

(12) United States Patent
Kite et al.

(10) Patent No.: US 8,485,425 B2
(45) Date of Patent: Jul. 16, 2013

(54) INLINE MAIL VALIDATION

(75) Inventors: Christopher J. Kite, Skokie, IL (US); George Mavelil Varghese, Elk Grove Village, IL (US); Arkadiusz Nieckarz, Palatine, IL (US); William A. Grady, Bedford, TX (US); Michelle R. Archer, Gilberts, IL (US)

(73) Assignee: Bell and Howell, LLC, Durham, NC (US)

( * ) Notice: Subject to any disclaimer, the term of this patent is extended or adjusted under 35 U.S.C. 154(b) by 744 days.

(21) Appl. No.: 11/656,012

(22) Filed: Jan. 22, 2007

(65) Prior Publication Data

US 2008/0173714 A1 Jul. 24, 2008

(51) Int. Cl.
*G06F 17/00* (2006.01)

(52) U.S. Cl.
USPC .............................. 235/375; 235/51; 235/386

(58) Field of Classification Search
USPC ................ 235/51, 53, 375, 386; 705/12, 402, 705/406
See application file for complete search history.

(56) References Cited

U.S. PATENT DOCUMENTS

| | | | | |
|---|---|---|---|---|
| 7,240,835 | B2 * | 7/2007 | Brucker et al. | 235/386 |
| 7,407,100 | B2 * | 8/2008 | Guyett et al. | 235/386 |
| 2004/0041017 | A1 | 3/2004 | McClure | |
| 2006/0049252 | A1 | 3/2006 | Guyett et al. | |
| 2006/0053084 | A1 * | 3/2006 | Haas et al. | 705/410 |
| 2006/0053085 | A1 * | 3/2006 | Guyett et al. | 705/410 |
| 2006/0060649 | A1 * | 3/2006 | Brucker et al. | 235/386 |

FOREIGN PATENT DOCUMENTS

| | | |
|---|---|---|
| WO | WO 02/00362 | 1/2002 |
| WO | WO 02/00362 A2 | 1/2002 |

OTHER PUBLICATIONS

International Office Action issued in International Patent Application No. PCT/US2008/051672, mailed Jul. 3, 2008.
International Preliminary Report on Patentability and Written Opinion of the International Searching Authority issued in International Patent Application No. PCT/US2008/051672, mailed Aug. 6, 2009.
The International Search Report and the Written Opinion of the International Searching Authority issued in Patent Application No. PCT/US2008/051672 dated on Sep. 16, 2008.

* cited by examiner

*Primary Examiner* — Daniel Hess
*Assistant Examiner* — Paultep Savusdiphol
(74) *Attorney, Agent, or Firm* — McDermott Will & Emery LLP

(57) ABSTRACT

Each respective mail item in a received batch of items is read to acquire information, which enables a plurality of verifications with regard to authenticity of the respective mail item. In a vote-by-mail example, one or more features are validated for authenticity in relation to the election, and one or more features are validated for authenticity in relation to a voter. The verifications in relation to a voter may involve detection of a signature and verification of the authenticity of the signature. The items are sorted according to the verification results and may be sorted based on other criteria. The methods, systems and software disclosed herein enable such verifications and sorting, in a single pass through a sorting system.

35 Claims, 5 Drawing Sheets

INLINE MAIL VALIDATION

TECHNICAL FIELD

The subject matter discussed herein relates to methods, systems and elements thereof for verifying each respective mail item in a received batch for authenticity and for associated sort processing inline in a single pass, for example, to support a vote-by-mail scheme.

BACKGROUND

There are a number of mail processing applications that involve verification of authenticity of incoming documents, in some cases, prior to opening the envelope or other type of mail item bearing the respective document.

For example, there is an increasing trend in the United States for voting-by-mail (VBM), a process whereby ballots are sent to registered voters via the postal authority (e.g., United States Postal Service or "USPS") and then returned by said voters by post or by dropping them off at designated ballot collection centers. The State of Oregon, for example, presently conducts its elections entirely through the VBM process. Part of the rise in popularity of VBM is attributed to the preponderance of evidence indicating that this method of voting leads to higher turnout than one where people vote in person or have to apply for a postal vote. Another reason for the rise in popularity of VBM is that it can help deter fraud by creating increased layers of checks and balances as well as produce a more visible/recordable paper trail. Reduction of cost and simplification of the election process are also desirable benefits attributed to VBM.

Successful facilitation of the VBM process requires the application of procedures and protocols for processing the influx of election ballots. This includes procedures and protocols for ensuring voter privacy, notification to voters of erroneous but necessary voter information, verification of voter authenticity, proper sortation of received ballots into one or more categories to ensure further processing, etc. One or more verifications are done prior to opening the return envelope. An exemplary scheme for the facilitation of VBM is shown with respect to FIG. 1, which depicts the high-level process with respect to the State of Oregon. Those skilled in the art will recognize, however, that the following discussion is exemplary in nature, and not descriptive of all VBM processes.

The process begins (1) with the voter filling out a registration form, which requires information such as the intended voter's name, address and signature. From off the registration form, the voter's signature is captured via a scan process and stored into a computer for future reference. Once the registration is approved, (2) an election packet is created for the voter, which includes: a ballot, return identification envelope with unique barcode printed thereon (no two voter's share the same barcode), and a secrecy envelope. This packet is sent to the voter via the applicable postal authority (3), and upon receipt, the ballot is filled out and then prepared for return by the voter (4). Preparing the ballot for return includes completing the ballot and sealing it into the secrecy envelope. The sealed secrecy envelope is then placed into the return identification envelope, which itself is signed by the voter as a means of certification, and returned (e.g., by mail) to the appropriate election office (5). Once received by the election office, various verification tasks must be performed.

The box labeled (6) describes the various steps required to be completed for processing of the envelope containing the completed ballot. In general, many of these steps require some form of verification or sortation of the returned ballot, such as verifying that the proper return envelope has been received (e.g., verifying the characteristics of the return envelope), verifying proper signature application onto the return envelope, verifying that the signature matches the voter signature on file, and proper sortation of received return envelopes based upon the various verification results. While this is but a few of the various verification and/or sortation considerations required to prepare the return envelopes for the next phase of processing—ballot tallying, generally these steps are performed manually by one or more volunteers or via combination of manual and automated/computerized tools (e.g., a handheld barcode scanner or imaging tool). While processing of this nature can be effective, visual inspection or matching is prone to human error, often slow, and can be detrimental to the ultimate integrity of the ballot return envelope verification process. Furthermore, offline or external tools used for performing the verification of return envelopes inhibits the rate at which the actual ballots contained within may be processed.

Clearly a need exists for improved automation of one or more of the verification steps, for processing of the in-bound mail items containing the ballots. United States Patent Application Publication No. 20060049252 by Guyett et al. teaches processing incoming mailed ballot packages having a voter ID code and a verification signature on the envelope and a ballot enclosed within the envelope. Prior to receipt of the incoming ballots voter signatures have been electronically stored and associated with voter ID's. Ballot packages are fed and transported on automated machinery. Voter ID's are scanned and cameras are used for capturing images of the verification signatures from the ballot packages. Based on the scanned voter ID's, electronically stored voter signatures are retrieved. Next, the captured verification signatures are compared with the stored voter signatures corresponding to the scanned voter ID's. A validation file is generated that indicates which ballot packages had verification signatures that were successfully matched with stored voter signatures during the comparing step. Finally, the automated equipment sorts ballot packages using the validation file to separate successfully matched and validated ballot packages from unvalidated ballot packages.

However, there is still room for further improvement. The technique disclosed in Publication No. 20060049252, for example, requires at least two passes of each in-bound item of mail purportedly containing a ballot—one pass to capture an image for signature analysis and a second pass to perform the actual sortation based on results of the signature analysis. Also, the signature based verification appears to be the only automated verification performed. The post verification sortation functionality also could be enhanced.

Hence, a need still exists for further improved techniques for performing verifications on in-bound mail items, e.g. for vote-by-mail applications or the like, and/or for attendant enhancements to the sorting of such mail items.

SUMMARY

The teachings herein alleviate one or more of the above noted problems with prior verification techniques, data capture, data analysis and associated mail item sorting, e.g. as might be applied to handle mail items containing ballots for a vote-by-mail procedure.

The teachings disclosed herein relate to methods, systems and software products, for implementing single pass inline verification(s) for authentication related purposes, data capture, data analysis and attendant sorting. These teachings are applicable to processing in-bound batches of mail items, for example, for vote-by-mail elections. Those skilled in the art will recognize, however, that the technologies are applicable in other contexts, such as remittance processing, incoming mail processing, tax return processing, contest entry processing, endorsement based payment processing systems, etc.

Hence, a method disclosed herein may offer single-pass processing for authenticating and sorting mail items of a received batch of mail items. One pass through a sorter system involves reading from each respective mail item in the received batch, to acquire data including mail item verification information and a representation of a portion of the respective mail item expected to contain a signature of a respective sender. The same pass through the sorter system also involves determining whether or not each respective mail item is authentic, by determining whether or not the mail item verification information satisfies applicable authentication criteria. A determination also is made as to whether or not an authentic signature is present on each respective mail item. The signature determination may be implemented by comparing the representation of the portion of the respective mail item expected to contain the signature to a prestored representation of a signature of the respective sender, and determining from the comparison whether or not the representation acquired from the respective mail item sufficiently matches the prestored representation of the sender's signature. The one pass through the sorter system also enables sorting operations. Each mail item in the batch is sorted into one or more designated bins.

The item information verification may verify a variety of features on each respective mail item. In an example for vote-by-mail, the processing provides an initial screening of ballot return envelopes, for valid relationship to the particular election and/or for a valid relationship to a registered voter. The signature verification would enhance the authentication vis-à-vis the voter that is sending back the ballot. The sorting of fully authenticated items may provide additional granularity based on information obtained from reading the mail items, for example, based on a detection of the applicable election precinct.

Another method disclosed herein provides a single-pass method of processing of return envelopes for a batch of mail items potentially containing ballots for a vote-by-mail election. In this method, a single pass through a sorter system includes determining from a first sensed characteristic of each respective one of the mail items of the batch whether or not the respective mail item exhibits a valid relationship to the election. The method also includes determining from a second characteristic of each respective one of the mail items of the batch whether or not the respective mail item exhibits a valid relationship to a voter registered to vote in the election, during the pass through the sorter system. Mail items of the batch not exhibiting the valid relationship to the election are sorted into a designated bin. Election related mail items that do not exhibit a valid relationship to a voter registered to vote in the election are sorted into a bin designated for further validation processing. However, during the pass through the sorter system, mail items of the batch that are found to exhibit both the valid relationship to the election and the valid relationship to a voter registered to vote in the election are sorted into at least one bin designated for further election processing of validated mail items. The precinct number could be used as an additional sort criterion.

The disclosed verification and sorting technology offers a number of advantages. Consider for example the signature verification process for a vote-by-mail application. An in-line single-pass automated verification procedure would ensure more accurate and efficient matching of the signature data in full accordance with verification rules (versus free will interpretation), while promoting greater signature verification uniformity and autonomy. Moreover, an automated, in-line sortation process based upon properly verified return envelope characteristics enables more efficient and expedited processing of ballots with no fragmentation of the various verification or sortation steps required.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
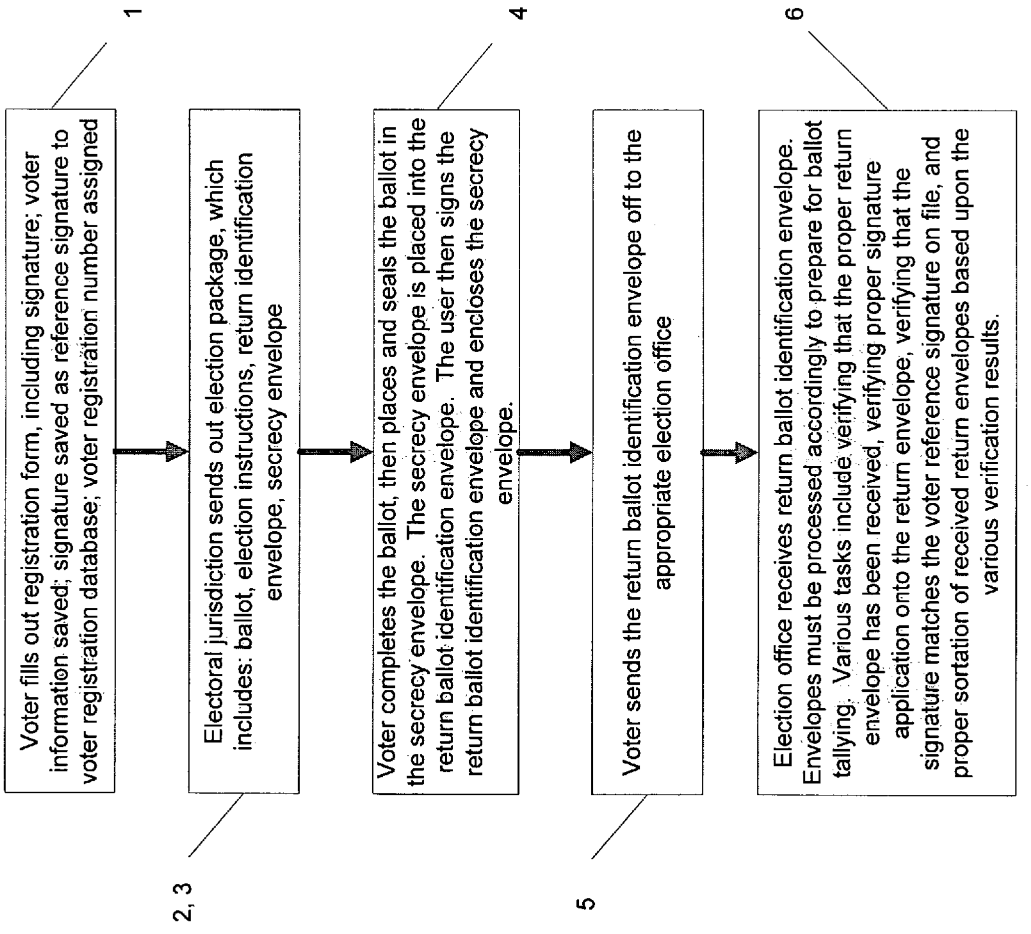
FIG. 1 (PRIOR ART)
FIG. 1 depicts a prior vote-by-mail processing scheme for an election.

The following description refers to numerous specific details which are set forth by way of examples to provide a thorough understanding of the relevant teachings. It should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings. It will be appreciated by those versed in the art that the exemplary teachings described herein enable inline verification of mail items.

As used herein, "inline" refers to the usage of automated or computer-based tools as part of a connected, seamless scheme and/or procedure—a scheme and/or procedure capable of being executed with little to no required disruption in the continuity of said scheme and/or procedure, and no required repeats of said scheme and/or procedure, in order to fulfill the desired processing objective. From a vote-by-mail (VBM) perspective, this may include automated processes such as mail item data verification, mail item categorization, verification results based mail item sortation, combinations of one or more of these processes as part of a single scheme and/or procedure, etc. in an automated sequence of operations, e.g. along a processing line. This is in contrast to "off-line" methods, which typically require the usage of external tools or processes in order to fulfill the overall processing objective. So, for example, imagine using an external imaging device to acquire signature data resident upon a mail item, or the necessity of repeating the verification scheme and/or procedure more than once in order to handle a plurality of ballot return identification envelopes. Though offline verification may help one eventually achieve the VBM processing objectives, it is not usually accomplished in a seamless, integrated way.

With this in mind, "inline verification" relates to means for executing one or more verifications in an authentication scheme and/or procedure in a seamless, integrated way. As used herein, "verification" pertains but is not limited to, schemes and/or procedures for enabling one or more of the following: the ability to detect, recognize, read or perceive an imaged object or character, the ability to interpret the literal or functional usage of an imaged object or character (e.g., interpret data for use as a variable for executing logical/algorithmic decisions), and the ability to correlate the imaged object or character with other data to determine the imaged character or object's validity with respect to predefined authenticity (e.g., whether or not the imaged object or character sufficiently matches other data on record to within a given threshold).

One or more such verifications are used to determine authenticity. The determination of authenticity may determine that a mail item is valid in some manner. The verification processing may also serve to authentic a mail item with respect to its sender, e.g. that the document originates with a valid sender (e.g. a registered voter) and/or that the mail item bears a valid signature of a particular sender (e.g. that the ballot return envelope has been signed by the registered voter). As will be presented later on with respect to the examples, inline verification as employed in connection with automated document processing systems may significantly streamline any scheme and/or procedure requiring various instances of verification to achieve the processing objective (e.g., the objective of authenticating and organizing return ballot identification envelopes in a VBM election process).

Also, as used herein, the term "document processing system" refers to any high speed transport device(s) capable of processing documents at considerably high rates with considerably high precision. Indeed, a document processing system may be one such tool usable for enabling inline verification, and may include a combination of other integrated devices for processing mail items. Document processing systems may include, but are not limited to, inbound mail sorting equipment, outbound mail sorting equipment, and even various forms of inserter machines, vision or data integrity systems, or combinations thereof for use within office, commercial, or industrial settings. A "pass" generally refers to a cycle or period of transport of a mail item or group of mail items through the mail processing device for application of specific processing rules, and is generally classified as first pass, second pass, etc. Processing rules may include, but is not limited to, an interpretation of the various markings resident upon the mail item(s), determination of a specific mail bin the mail item(s) is to be directed, determination of whether or not to mark or add labels to the mail item(s), whether or not to print or open items, and other rules generally set forth according to a defined schema (e.g., sort scheme).

Mail items are articles or pieces of mail, in this case requiring verification(s) to determine authenticity thereof in one or more ways during in-line processing through a document processing system.

While the foregoing discussion presents the teachings in an exemplary fashion with respect to a conventional sorter device, it will be apparent to those skilled in the art that the teachings may apply to any type of document processing device or system (e.g. an inserter, and accumulator, etc.) usable for processing vote-by-mail materials.

Figure 2:
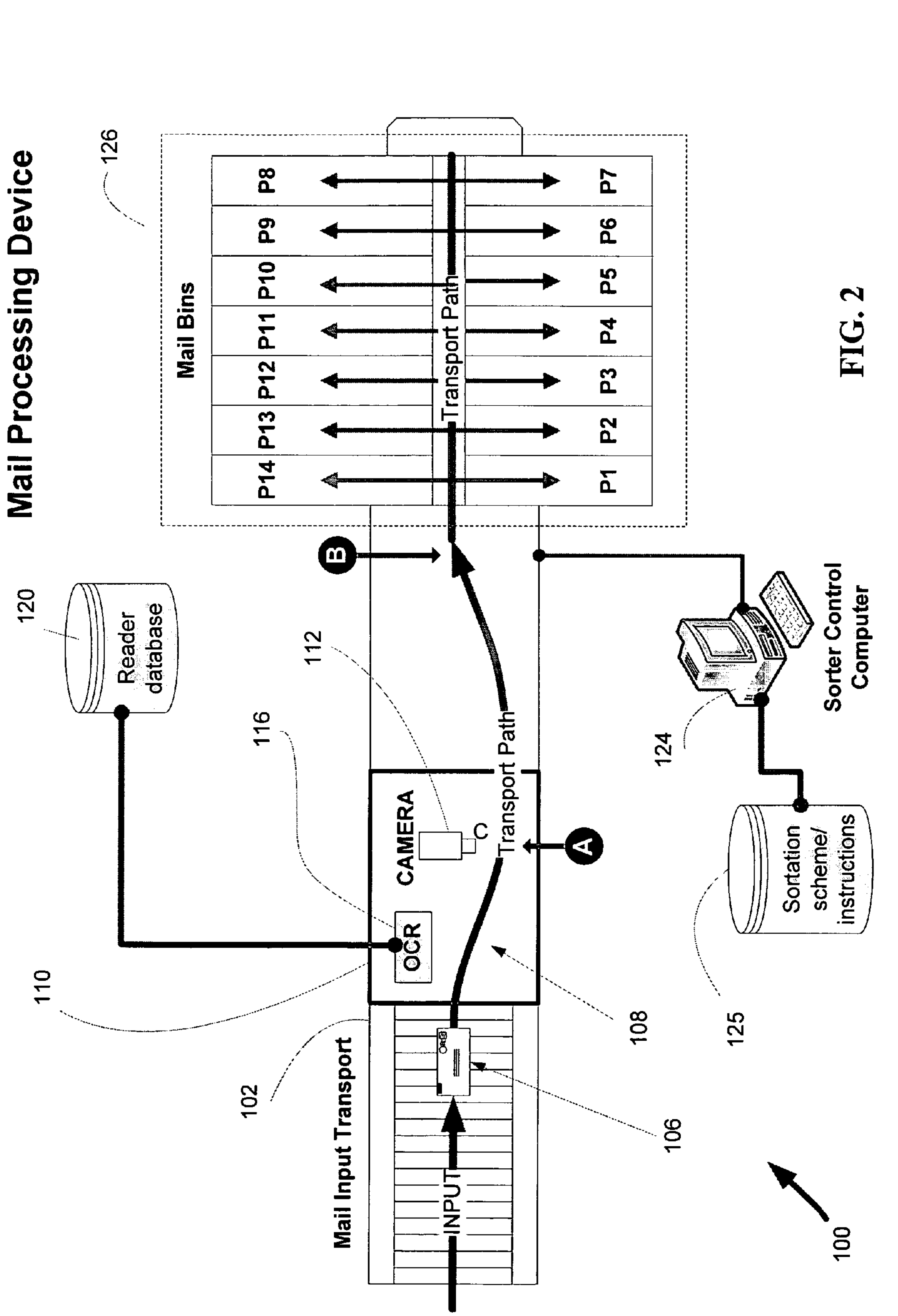
FIG. 2 depicts an exemplary mail processing device for processing mail items in accord with a specific scheme or set of schemes, as discussed in the detailed description below.

The description now proceeds with a discussion of FIG. 2, which depicts an exemplary document processing device—in the form of a sorter—for processing mail items 106 in accord with the exemplary teachings. Although useful in other applications, the authentication and sorting scheme will be discussed here by way of example with regard to processing of incoming mail items related to a vote-by-mail (VBM) election, such as return envelopes intended or expected to contain election ballots. For the VBM application, the focus of the solution shown in the drawings is to enable the customer (party handling the election returns) to complete most of the required verification(s) to authenticate the document and/or authentic the document with respect to its sender, capture required data and complete sorting in the first pass. Sorting operations include sorting based on success or failure with regarding to one or more of the verification, and the sorting may include sorting based on additional criteria, such as precincts in the VBM example. Subsequent passes should be required only for sorting to a more detailed level or to further analyze envelopes that did not clear one or more of the first pass verifications and thus were not able to be fully authenticated in accord with the particular authentication scheme (e.g. bad image, doubles etc.).

Hence, the illustrated system performs a number of verification operations for authentication, capturing data and sorting mail items, of a received batch of mail items. For the VBM example, the mail items are return ballot identification envelopes. In such an application, the system may perform one or more information verifications for screening purposes, perform a signature verification, capture required data then sort the envelope type mail items into appropriate bins, in the first or only pass of the complete batch through the system.

Document processing facilities often use high speed document processing devices such as sorters 100 to direct mail items appropriately to one or more mail bins 126, marked as P1 through P14, for distribution. The efficiency of a sorter 100 is generally dependent upon various factors, including the rate at which mail items 106 can be fed into a mail transport 102 and subsequently transported along a transport path 108 via a system of mechanized pulleys, levers, diverters and rollers; the ability for the address components (e.g., recipient address, zip code, POSTNET barcode) marked upon the mail items to be identified by a reader device 110 for association of each mail item with a sort scheme managed by a sort scheme computer 124; and the number of mail items that can be effectively stacked into the mail bins 126 respective of the quantity of mail items being processed. Generally, sorter devices 100 execute a number of passes in order to direct mail items to their respective mail bins 126. The first pass is typically reserved for identifying the characteristics of the mail items, including the gathering and interpretation of image data revealing data such as the sender address, recipient address, postage data, barcode data, unique identification codes (e.g., voter registration number, election code), ZIP Codes, etc. and sortation based on easily interpreted data. For more involved interpretation or verification, offline processes are generally adopted, followed by subsequent passes to direct the mail items to mail bins based on said characteristic data or verification results. It will be appreciated by those skilled in the art, however, that the teachings herein present a methodology and system for enabling the processing of mail items relevant to a VBM process to be processed in a single pass.

The reader device 110 that is coupled to sorter 100 is equipped with an imaging device such as an optical scanner or camera 112. The camera or optical scanner 112 images the entire mail item, or at least specified regions of interest on the mail item, as it is processed by the mail processing system 100 along the transport path 108. Typically, the reader device 110 is placed upstream along the transport path 108 so that the various characters, objects or regions of interest on the mail item get scanned early on in the processing phase, and subsequently interpreted using optical character recognition technology (OCR) 116. Typical OCR systems 116 may be implemented as software modules that analyze image data representative of the various characters (e.g., text), objects (e.g., images or barcodes) or specific regions of interest as detected upon the mail items. Alternatively, the OCR system may include a combination of hardware such as specialized circuit boards and software to interpret image data.

Those skilled in the art will recognize that various OCR systems may be employed by the reader device 110 for the purpose of verifying various objects and characters residing on the mail item 106. In particular, varying implementations of OCR systems may be applied to enhance the rate of character and/or object processing efficiency, and thus speed-up verification or validation operations to enable authentication and sortation via a single pass. For example, specialized OCR systems, such as barcode readers, handwriting recognition modules and signature verification modules may be employed as needed for performing verification (e.g., identification, interpretation) of select objects upon the mail item 106. Such specialized systems may also include the necessary algorithms for performing image normalization, a process wherein a reference image (fixed variable) and an acquired image (input variable) may be adjusted to compensate for variances in scale, color, contrast, brightness, orientation, or other factors between the two. Image normalization may also be applied to eliminate image variations (such as noise, illumination, or image occlusion). Generally, image normalization is used as a preprocessing stage to assist computer-based object and/or character perception.

Another means for enhancing the image verification process is through regions-of-interest (ROI) processing. ROI processing entails selecting and training of the OCR system to analyze select points or boundaries within an image. It is sometimes of interest to process a single sub-region of an image—i.e., specified within a particular coordinate range or as perceived in accord with a specific identifying mark—while forgoing analysis of any other regions of the image or analysis of the entire face of a mail item. The selected boundary ranges need not be symmetrically shaped (e.g., a rectangular boundary), and thus, provide a customizable threshold or window from which to perform image data analysis. Once defined, the user can specify the desired operation on the data in this region of interest. This may include, but is not limited to, data verification against a list of possible values, comparison against a reference image, address matching, selective reading of characters, as well as additional calculations (possibly customized) or dependencies between elements within or across ROIs. Regions of text may be processed via the OCR technology, indicia may be identified with pattern matching and signatures may be processed using matching algorithms. The output of these operations may then be used as a sort parameter. Suffice to say, by limiting the OCR to one or more defined or customized regions of interest, data processing time is greatly reduced. Furthermore, ROI processing increases the likelihood of image verification due to more stringent analysis settings. Indeed, for both ROI processing and normalization processing, it is even possible to establish verification threshold values, wherein characters and/or objects under interpretation against reference data may be analyzed with more or less scrutiny—i.e., image data representative of signature is designated invalid if a 90% match is not determined. Existing OCR systems as described above and other like utilities are available on the market today, such as those provided by Parascript LLC or SOFTPRO Group.

The image verification process may be even further enhanced by enabling the capability for multiple ROI definition sets (a single set being one or more ROIs as described above) to be linked to specific envelope designs (or groups of envelope designs). The determining factor for an envelope design (or group of envelope designs) could be physical dimensions (length, height, thickness), presence (or absence) of identifying marks (such as Business Reply Envelope markings), logos or images, certain identifying characters in specific locations, or the presence (or absence) of blocks of data in specific areas of the envelope, or a combination of these factors. After capturing the image, the sorter can determine the envelope design, then refer to the ROI definition set linked to that specific envelope design to determine where to look for the desired information. This would enable different envelope designs to be successfully handled in a single pass. This may also be particularly useful for implementation within electoral jurisdictions responsible for handling different election types within the same period of time—i.e., state election and local election simultaneously.

In a VBM processing scheme, the signature region is expected to be in the same location for a specific envelope design. Hence, the region of interest (e.g., for capturing the signature) can be pre-defined by providing the image processing system with the coordinates of the window as measured from a reference location on the envelope. Alternately, the region of interest can be pre-defined via an imaging software application by processing one envelope of a particular design and displaying the captured image. An operator would then select the region of interest on the display. Once the region of interest is identified, the image processing system will send only the section of the image containing the signature to the signature verification function. Similarly, the image processing system may send only data for another defined region of interest, e.g. a region expected to contain a printed name, an address, a VRN, an election code, or a bar code containing one or more of these pieces of election/voter related information. The user can then specify the desired operation on the data in this region. Validation against a list of possible values, comparison against a reference image, address matching, additional calculations (possibly customized) are possible operations. The result is reduced image processing time for region of interest location and image processing, since the size of the image processed for a given verification has been reduced to only the respective region of interest. For a selected region of interest, such as the region for the signature, the processing would normalize the image data for that region, as outlined above, before comparison of the image data for the region to the respective reference data. The process could be repeated to create ROI sets for each envelope design.

As an option, the reader device 110 may also employ a monitor (not shown) for rendering a graphical user interface to an operator of the mail sorter 100 that enables the operator to adjust the settings or features of the reader device. The reader device 110 may also access a reader database 120 which stores reference data—data records to be referred to or compared against image data acquired from a mail item in order to authenticate said mail item and/or its sender. For example, in a vote-by-mail processing environment, the OCR system 116 operating in connection with the reader device 110 may fetch voter signature reference data from the reader database 120 to be compared against acquired image data representative of a voter signature affixed to a ballot return identification envelope. The voter signature reference data may be associated with a voter registration number as assigned during the time of registration of the voter. Proper analysis and comparison of the reference data and image data can be performed to verify the authenticity of the signature affixed to the ballot return identification envelope.

Operating in association with the sorter 100 is a sort control computer 124, which has access to a sort scheme database 125. The sort scheme database 125 contains one or more sort scheme files, which control how the sorter directs the imaged mail items once interpreted by the reader device 110. The sort file is generally implemented as logic reliant on a combination of the verification results of the imaged mail item and other sort parameters. As such, the reader device 110 enables the sorter 100 to analyze or verify mail items, while the sorter control computer 124 provides instructions on how interpreted mail items 106 are to be directed to respective mail bins 126.

With the above discussion in mind, the ability to verify aspects of received mail items to determine authenticity thereof and subsequently sort the mail items as part of an integrated, seamless process, increases the effectiveness of any large scale sort operation, particularly where authenticity relative to the item or its sender or of significant importance. Hence, in a vote-by-mail (VBM) context, practitioners of the art will recognize and appreciate the same. That the ability to read and authenticate a plurality of ballot return identification envelopes against established ballot preparation or screening criteria and/or requirements (e.g., origin certification data, voter registration number, signature verification, etc.) and sort them directly based upon said various verification results in a single pass is critical to the effectiveness of the VBM procedure. First pass processing capability is due in part to the ability to sort authenticated mail items with no intermediary steps in-between (e.g., without human analysis of voter signatures, or without creation of signature integrity files from which to base sort decisions). In this way, processing is more efficient as subsequent passes are required only for sorting to a more detailed level if desired (e.g., sorting by precinct number), although this too can be performed during the first pass depending on the robustness of the applied sort scheme and the number of bins available. While VBM is an example of a procedure benefiting from said benefits, the same practitioners of the art will acknowledge the application of the exemplary teachings herein to any process benefiting from inline verification and criteria based sorting. Such processes may include, but are not limited to, tax return processing (e.g., as employed by the Internal Revenue Service), contest entry processing (e.g., Publishers Clearinghouse), endorsement based payment processing systems, etc.

The system of FIG. 2 may be operated to process ballot return envelopes to satisfy a variety of requirements applicable to a vote-by-mail (VBM) election. Examples of VBM related requirements that may be met by the exemplary processing on the verification and sorting system of FIG. 2 include:

- The ballot should be authenticated to be for the correct election (either by identifying unique physical characteristics of the envelope design or by verifying the election code)
- Envelopes without a signature should be separated
- The name printed on the envelope by the customer (if present) should be compared to the name on record for the Voter Registration Number printed on the envelope
- The signature on the envelope should be compared with the signature on record (taken from the Voter Registration Card)
- The Voter Registration Number should be verified to determine whether it is still valid. (The voter may have left the county or may have already submitted a ballot for this election)
- Sort based on the precinct number (multiple passes) or on defined combinations of other numbers on the envelope
- Ability to mark the nth envelope to a bin
- Ability to selectively open certain ballots (to be authenticated)
- Ability to spray text on the envelope based on some of the verification outcomes.

Although more granular sorting of authenticated return envelopes could be performed on a later pass, the present teachings also teach sorting of the authenticated return envelopes in a single pass through the system. In the vote-by-mail example, this may enable a sortation based on the precinct number or on defined combinations of other numbers or text on the envelope. To sort by precinct, the single pass processing would also determine an applicable precinct for each mail item in the batch, at least for those items that have passed both the initial screening verification(s) and the signature verification. Then, the sorter would sort each such authenticated envelope to a bin designated for the respective precinct.

Figure 3:
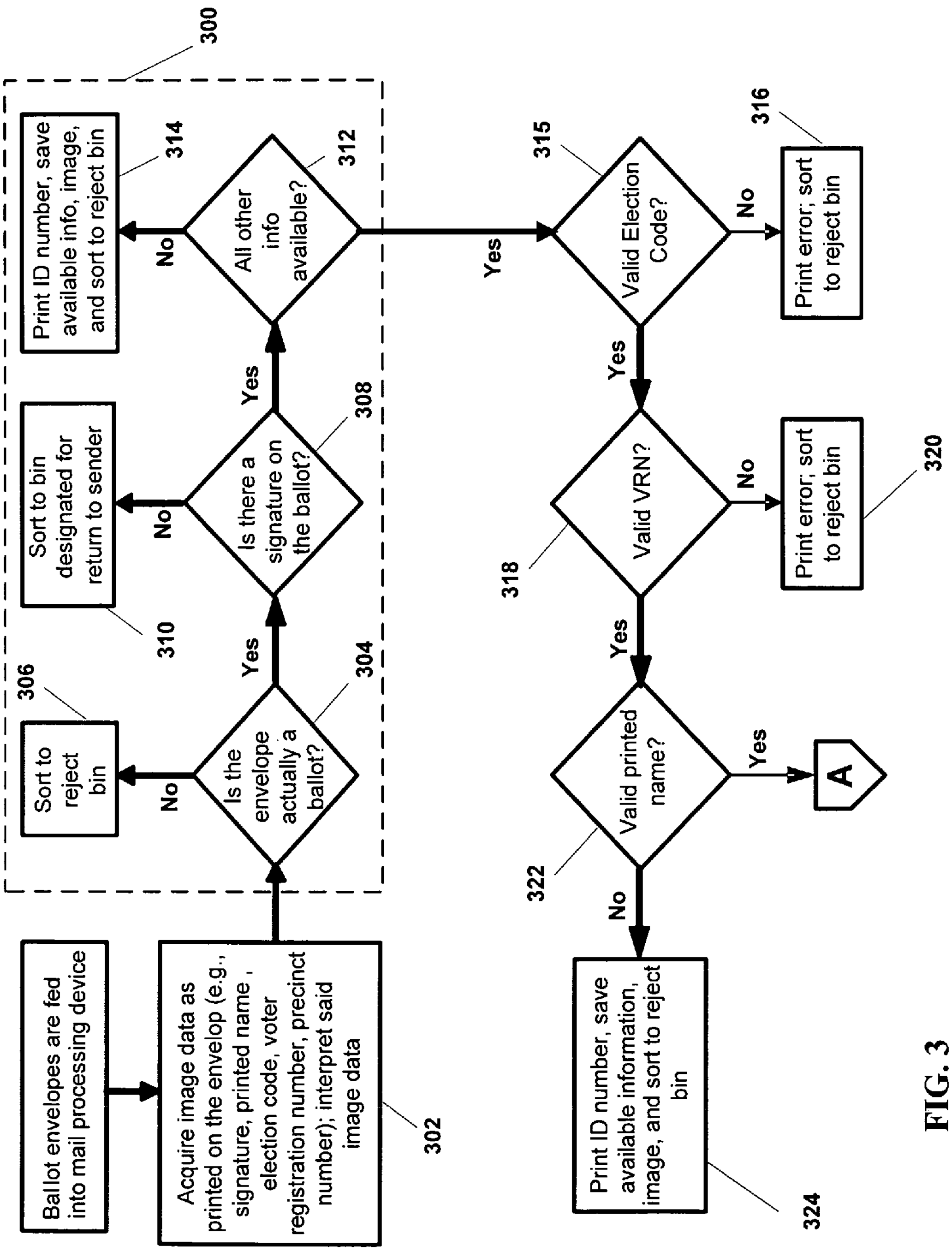
FIGS. 3 and 4 together provide a flow chart, illustrating exemplary steps of a scheme by which mail items may be processed to ensure proper verification and sortation of the mail items with respect to a vote-by-mail election process.
Figure 4:
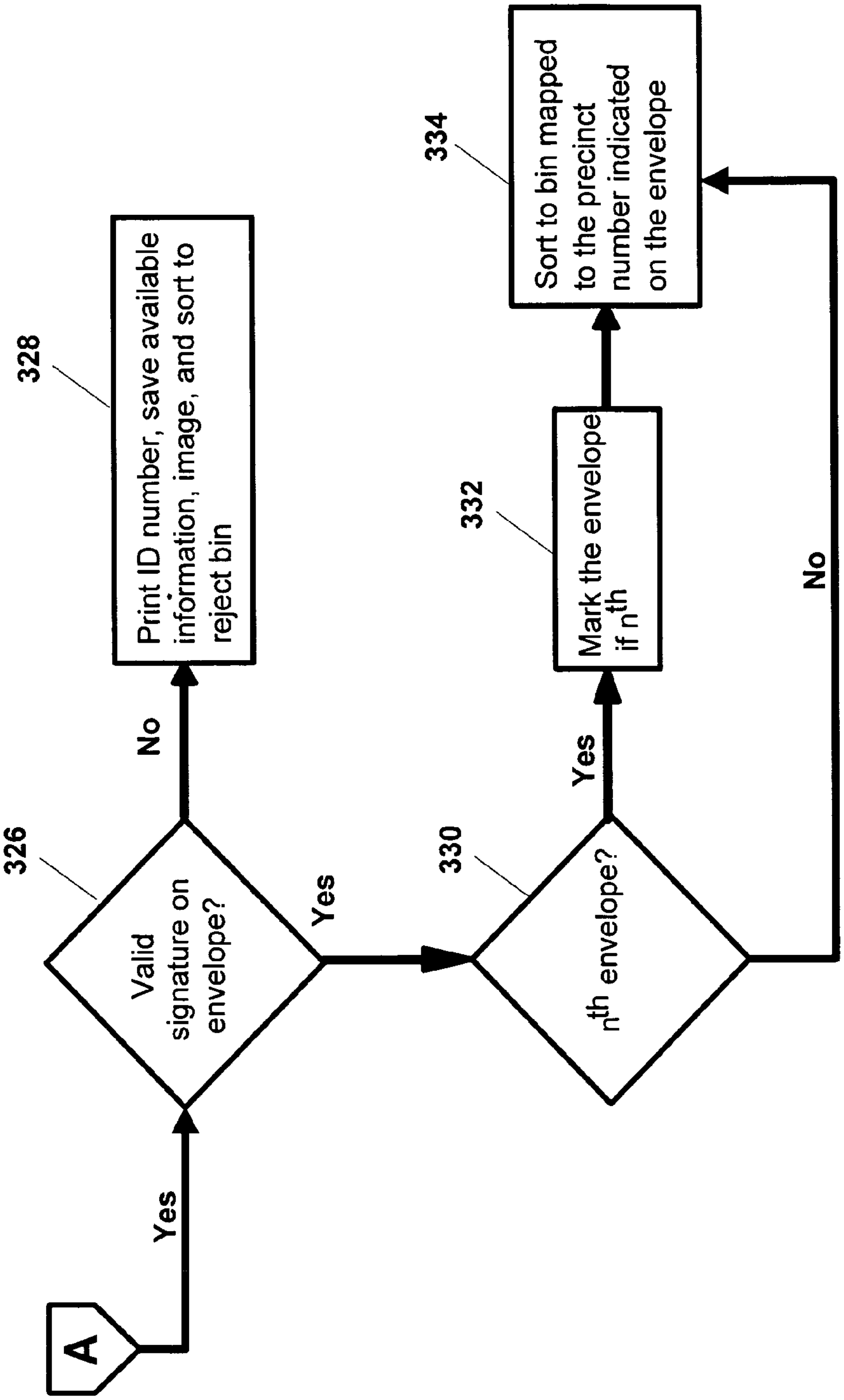

Reference is now made to FIGS. 3 and 4, which depict an exemplary scheme by which a plurality of mail items may be processed by the sorter 100 to ensure inline processing of mail items, in this case, ballot return identification envelopes. In particular, but not by way of limitation, the processing scheme required for facilitation of a VBM process with respect to ballot return envelope preparation criteria and/or requirements are presented. For the sake of clarity with respect to the teachings, FIGS. 3 and 4 depict the exemplary verification steps and corresponding sort decisions that occur from the moment of image capture and prior to the advancement of a mail item to a particular mail bin.

Firstly, after the ballot return identification envelopes are received and input into the sorter 100 at the mail input transport 102, image data associated with each mail item is acquired (event 302) and a unique ID is assigned to it. Based on specified criteria, the envelope design will be identified. Based on the envelope design, the specified ROIs will be examined with one or more selective scanning instructions (e.g., scan by coordinates or region). Various markings may reside on the return ballot identification envelope, including those assumed as marked onto the envelope by the voter and those pre-printed onto the ballot in advance of receipt by the voter. Examples of markings that may be placed or written onto the envelope by the voter include, but are not limited to voter signature, handwritten name (in certain jurisdictions), unique assigned voter identification or registration number and/or other origin certification data. Examples of markings that may be placed onto the return ballot identification envelope in advance of voter receipt may include, but are not limited to, an election code, precinct number, voter name, address and ZIP Code information, voter registration number (VRN), barcode information (e.g., POSTNET, PLANET), VRNs encoded as a barcode or radio frequency identification tag (RFID), or as text, duplicate ballot indicator, special processing instructions, county or state insignia or images, unique envelope identification numbers (may be printed in fluorescent ink for tracking purposes), etc. Once acquired, the above markings are interpreted via the OCR utility so as to determine their meaning and/or intended function based on user-defined or pre-programmed rules.

One or more items of verification information regarding each respective mail item is processed for initial screening to determine whether or not the respective mail item is authentic. Each item of verification information acquired by reading of the mail item, in this case the respective ballot return envelope, is checked to determine whether or not the mail item verification information satisfies criteria for an authentic mail item. The criteria can be defined to verify validity of a relationship to the particular election, whereas other defined criteria may verify a valid relationship to the sender/voter as does the signature verification.

Hence, in our example, as a first instance of a screening verification, the ballot return identification envelope is screened to ensure the presence and readability of data upon a mail item. The screening steps are depicted in the figure as dashed box 300. A check of acquired data is performed to determine whether or not the envelope submitted by the voter is an official ballot return identification envelope (event 304). This may be accomplished in numerous ways, including but not limited to: verifying the presence of certain markings at specific locations or regions of interest upon the envelope, verifying the correlation of estimated dimensions of the imaged envelope with the known dimensions of an official return ballot identification envelope, color verification, metallic content detection verification, etc. If the envelope is determined invalid (e.g., the voter erroneously submitted their ballot in a plain standard sized envelope), a reject code corresponding to the type of verification failure is assigned, and the mail item is sent to a mail bin designated for errors of this kind (a reject bin) (event 306).

When the envelope is determined to be valid, a next verification procedure is performed, in this example, to determine the presence of the voter's signature (event 308). As discussed previously, unsigned ballot return identification envelopes may not be further processed and must be returned to the sender. In such cases, these envelopes may be assigned a corresponding error code and then directed to a bin for accumulating mail items to be returned to sender (event 310). Additional verification during the screening stage 300 may include verification of the presence of other expected information on the envelope (event 312). The other expected information may include, but is not limited to, a voter registration number (VRN), election code information, precinct number, printed voter name and address, or even a duplicate ballot indicator as applied to a reissued ballot return identification envelope—i.e., the voter lost their original or never received it. The duplicate ballot indicator is an additional object or character, which when marked onto the reissued return ballot identification envelope, distinguishes it from that originally issued. If any of the above information is not present or readable (verifiable), the envelope is directed to a designated reject bin. Optionally, the image data representative of the expected information may be recorded in connection with a unique identification value, which may also be marked onto the envelope.

The unique identification value may be used where it is desired to perform local video encoding (LVE), remote video encoding (RVE), or other forms of secondary verification or analysis for rejected mail items. LVE and RVE processing is well known in the art and will not be described in detail herein. Furthermore, application of LVE or RVE as optional analysis functions in the instance of mail items failing a verification being rejected does not limit the scope of the teachings herein. Indeed, those skilled in the art will recognize that additional verification techniques such as video encoding may be appropriate in instances where computational methods (e.g., OCR unable to read data) is insufficient for enabling character or object recognition and/or reconciliation ability.

When the expected mail item verification information is verified as present and readable, further verification of this information may be performed, including verification of the specified election code (event 315), verification of the specified voter registration number (VRN) (event 318), and verification of the printed name on the envelope (event 322). This may include determining whether the image data representative of said information matches any data on record, where a match is an indication of the validity of the imaged data. Invalidity of the election code or voter registration number results in the directing of the envelope to a designated bin (e.g. a reject bin), corresponding to events 316 and 320 respectively. The VRN may also be verified against a refreshed or up-to-date voter registration data so as to account for changes or discrepancies that may occur (e.g., the voter may have left the county or may have already submitted a ballot for this election).

The voter registration data, which may include the reference signature data, voter name and address, and other information associated with an assigned VRN, may be acquired as part of a periodic batch process or in real time via a network connection with a voter registration system server. In the context of the present teachings, this provides a means of detecting the presence of and subsequently thwarting (rejecting) instances of duplicate return ballot identification envelopes during the first pass. For example, the screening operations may include a check of a database to confirm that there has been no previous receipt/processing of an authentic ballot for the respective voter for this election. The system might update the database downloaded information on the sorter/network of sorters as well, regarding the status of a VRN, e.g. to avoid reuse in a subsequent attempt to validate a later received ballot return envelope. Those skilled in the art will appreciate this capability, as no additional processing need be employed beyond a single pass for accounting for VRN assignment discrepancies or possible instances of fraud.

As a further means of verification, printed name verification (event 322) may include accessing a list of valid alternate spellings for said name, and/or matching of the acquired image data representative of the printed name against the reference printed name data associated with a respective VRN. In the case of an invalid printed name, the envelope is directed to a designated bin such as a reject bin (event 324). Again, as in event 314, additional analysis such as local or remote video encoding may be applied if desired in order to interpret the imaged data. When the envelope has passed all screening verifications through step 322 in our example, the processing has determined that the mail item is authenticate and has passed at least a first level screening as to authenticity regarding the sender, that is to say, the return identification envelope has been determined to exhibit a valid relationship to the particular election and to exhibit at least an intial valid relationship to a registered voter.

Once the printed name is verified, the next steps in the ballot return envelope preparation scheme and/or procedure are depicted in FIG. 4. Specifically, any origin certification data, such as the voter signature, may be verified (event 326). Signature verification may include determining whether the acquired image data representative of the voter signature sufficiently matches the reference voter signature data associated with a respective VRN. Signature verification algorithms are known, for validating a new sample in the form of an image or other representation, by comparison thereof to a reference sample or other representation. An exact match may be rejected as a photocopy, however, a representation of an acceptable new signature will exhibit a certain degree of correlation to the reference signature.

Voter signature data on record (reference data) would correlate to that obtained at the time in which the voter registered, perhaps stored to a voter registration server maintained by the electoral jurisdiction, and made available to the reader database. Signature verification may also include usage of specialized signature verification modules (e.g., specialized OCR) for performing signature authenticity analysis, penmanship evaluation, age progression analysis, and other techniques to within specified thresholds. If the signature is unable to be verified—i.e., the signature did not sufficiently match any records on file for that particular voter, or a signature recognition procedure invalidates the signature—the envelope is directed to a designated bin (e.g. a reject bin). Additional analysis may then be applied upon the mail item such as LVE or RVE, or at the time of a subsequent pass of the mail item. If on the other hand the signature is verified, this signifies completion of all of the verification requirements, that is to say that the envelope is fully authenticated; and the envelope qualifies for the next phase of processing with respect to the VBM scheme (e.g., ballot processing—not shown). The remaining steps may include marking of the $n^{th}$ envelope prior to sortation of said envelope to the appropriate mail bin (events 330 and 332). In some electorate jurisdictions, marking of the $n^{th}$ envelope may be executed to facilitate easier accounting of ballots received for ballot processing. As a further convenience, the authenticated ballot return identification envelope may be directed to a bin, based on the precinct number marked on that envelope (event 334) or based on valid combinations of other sort parameters, at the end of the single pass through the system.

For the sake of clarity regarding the above described exemplary teachings, it is important to mention that various processing considerations will be readily apparent to those skilled in the art. Firstly, it will be recognized that the above described scheme is not limited to the specific order of steps described herein. Indeed, certain verification steps may be performed in different order (e.g., perform election code verification (event 315) after voter registration verification (event 316)) without limiting the scope of the exemplary teachings. Secondly, depending on the design requirement of ballot return identification envelopes, which may vary from one electoral jurisdiction to the next, letter opening tools and processes may be required for removing envelope flaps that expose information requiring verification. Where this is the case, this additional processing step may be required—i.e., the step of opening an envelope flap prior to verification of the signature on the ballot (event 308). An inline tab or flap removal device may be placed along the transport path 108 accordingly to address this need.

As a third consideration, it will be apparent to those skilled in the art that a printer or labeling device may be placed along the transport path for intercepting any envelopes prior to placement in a particular bin. For example, a return ballot identification envelope directed to a reject bin may have an error code or rejection status notice placed upon it, either as a label or from direct ink spraying. As another example, a authenticated return ballot identification envelope may have additional processing instructions printed or labeled onto it. Hence, with respect to the above described exemplary figures, instances of mail items failing one or more verifications may all include the usage of such printing mechanisms. Alternatively, the teachings coincide with those skilled in the art who wish to assign designated bins for each respective type of verification failure that may occur (e.g., bins P1-P4=return to sender only mail) as opposed to the printing of error codes. In this way, when mail items are manually swept (removed) from the reject bins, they all correspond to the same verification error type as opposed to multiple types residing in a single bin (e.g., invalid election code vs. invalid voter registration number).

As a fourth consideration, practitioners of the art will recognize the feasibility of assigning unique identification numbers to each envelope processed for enhanced tracking capability. The assigned ID may be printed as a barcode or number, possibly using fluorescent ink to prevent interference with other markings on the envelope. As such, multiple elements of information regarding a mail item such as sort parameters, envelope image, signature image (in the case of VBM), physical characteristics, sort decision, time processed, etc. may be recalled for tracking purposes. In the event of any ROI not being read correctly, it would be possible to enter the data using an LVE or RVE station and upload the data to the unique ID. The envelope could then be processed on the sorter and the sorter would read the ID, access the updated data linked to this ID and make a sort decision. Another application of the unique ID is auditing and tracing of envelopes. In particular, envelopes would be traced using the ID to locating the time and the specific bin it was sorted to. This feature would be useful to physically locate duplicate ballots even if duplicates were run on two independent sorters at the same time, by doing a comparison of the log files and identifying the unique IDs of the duplicate ballots.

As yet another consideration, those skilled in the art will recognize and appreciate that various reports which may be generated based on the sortation process. Reports generated may include manifest reports detailing exactly which ballot return identification envelopes have been sorted, the corresponding voter name, voter registration number, election code, etc. Likewise, error reports may be generated indicative of the various ballot return identification envelopes that were not authenticated, why they could not be authenticated (e.g., associated error code), corresponding voter registration number, election code, etc. If so desired, such reports may be provided with respect to the totality of envelopes processed (e.g., a master report) or broken down by precinct. Additional reports could include individual mail bin reports, which detail the plurality of envelopes and associated voter registration numbers assigned to a bin. A signature verification report may also be generated to display the acquired signature image data versus the signature image data on record in association with a given VRN.

Such reporting capability based on verification, and furthermore the ability to collect vital VBM data as a function of an inline process, could further aid in identifying instances of fraudulent activity or inconsistency. For example, user defined counts such as the number of return ballot identification envelopes received per voter registration number could be maintained. As another example, a count of the number of return ballot identification envelopes received versus sent out to registered voters may be calculated and subsequently reported. Other relevant data may be accumulated and processed for revealing metrics of interest, as well as enabling greater comprehension of election activity. While numerous other considerations may be accounted for by those skilled in the art, ultimately, it will be realized that the above described teachings enable inline verification and sortation of qualified mail items via a single pass process. In this way, subsequent passes may be required only to further analyze envelopes that were rejected for one reason or another, or for sorting to a more detailed level. Hence, as the plurality of mail items are authenticated inline on first pass of the batch of tiems, the teachings also present a means for convenient fine-tuned sorting based on one or more criteria of interest—i.e., sort based one or a combination of the precinct number, electoral code, voter last name, district identification, etc. Indeed, criteria based grouping of envelopes could be achieved at the preference of the mail processing device operator or electoral jurisdiction.

Figure 5:
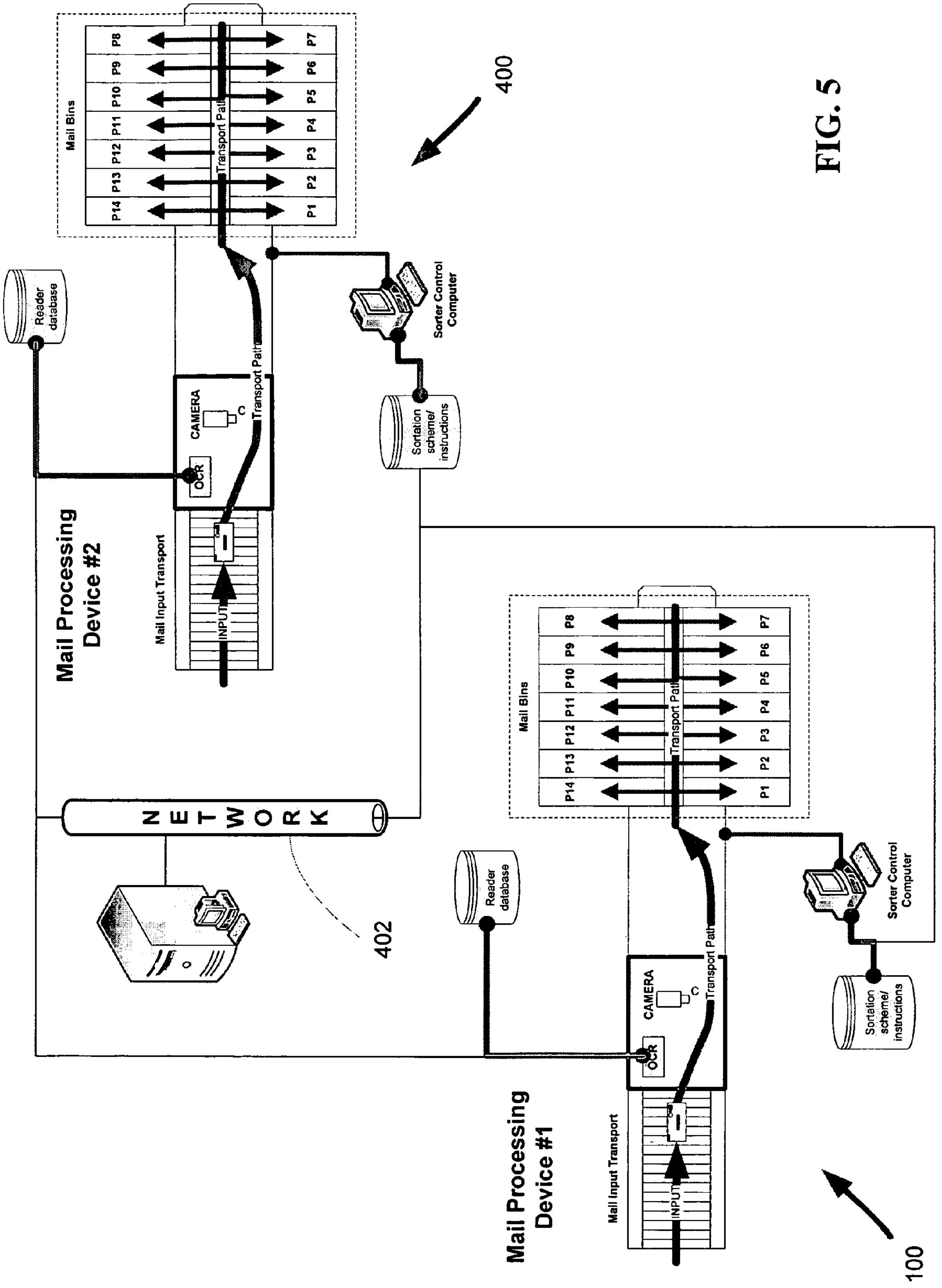
FIG. 5 depicts an exemplary process for performing mail item quality analysis.

The teachings presented above may also be employed in a multiple sortation processing environment for achieving the processing objectives of a VBM scheme and/or procedure. This is illustrated with respect to FIG. 5, which provides an exemplary depiction of a plurality of mail processing devices 100 and 400 in the form of sorters in communication over a network 402. Also connected to the network is a server device, which may be utilized for compiling and storing instances of the data and/or reports as (such as described above) generated by respective devices 100, 400.

Each mail processing device 100 or 400 provides single-pass verification and sorting on mail items in received batches, as discussed above relative to FIGS. 2-4. Both devices operate relatively independently. However, relevant data may be shared between the control systems of the mail processing devices 100 and 400 via the network 402. The exchange of information between the plurality of sorters 100, 400 over the network 402 may be performed as a local communication process or as a remote process. Hence, the plurality of sorters 100 and 400 need not physically reside within the same physical proximity in order to share information Various types of information may be shared between the sorters 100 and 400 as it relates to the facilitation of a vote-by-mail procedure, including but not limited to: (1) instances of the same VRN occurring at the different machines for advanced notification of duplicates, (2) updated VRN data, (3) instances of machine downtime reporting for enabling easier reallocation to a different sorter, (4) common discrepancy information for enabling shared communication of electoral challenges (e.g., unusually high numbers of return ballot identification envelope misprints), (5) aggregate compilation of the percentages of return ballots identification envelopes received by district, election code, or precinct number, etc. Indeed, numerous other types of information could be exchanged between the plurality of sorters 100 and 400. Those skilled in the art will recognize that network communication of this nature enables greater inline processing of ballot return identification envelopes with respect to the totality of electoral processing facilities.

Features of the exemplary Vote By Mail solutions may include any or all of the following:

1. Single Pass solution consisting of:
   a. Screening
      i. Read multiple elements from the mail item (can be any type of barcode, text or image):
         1. Voter Registration Number (VRN)
         2. Election code
         3. Precinct Number
         4. Duplicate ballot indicator (for voters that request a replacement ballot)
         5. Name and address of voter
         6. Signature
      ii. Validate some or all of the elements read from the envelope using an approved customer-supplied list of values/reference elements or presence/absence
      iii. In the case of signature, at the screening stage the presence/absence of a signature would be checked
      iv. The Region Of Interest for each of the elements can be specified by the user to minimize the risk of erroneous interpretation and improve the performance of the system
      v. Physical characteristics such as color, height, length, thickness, metal content etc could be used as well
      vi. An envelope could be rejected on the basis of the above data, with different reject codes assigned to it
   b. Record the number of ballots per VRN and check for duplicate ballots per election code. Could be either
      i. Realtime check
      ii. Batch process at predefined periods
      iii. Both of the above could apply to multiple sorters in a networked environment
   c. Associate a unique ID number for each envelope. This number could be printed on the envelope using fluorescent ink for traceability
   d. Signature verification
      i. Automatic verification of the signature using an integrated module (Parascript, Softpro)
      ii. Option to set threshold for verification accuracy
   e. Sorting and additional operations: The envelope will be sorted after possibly conducting additional operations on it. Both sorting and additional operations would be based on valid combinations of multiple sort parameter values that could include specific values (or ranges of values) of the elements that are read from the envelope, results of a text or image comparison (match/no match—this covers checking for valid election code and/or VRN), physical characteristics of the envelope, presence/absence of information (image/text/signature), check for duplicate ballots and signature validation results.
2. Local Video Encoding: If ANY of the required elements were unable to be read, or in the case of a signature failing the automatic verification, an option will be provided for information to be entered manually.
   a. The terminal could be either on the sorter, or will be networked to the sorter
   b. The terminal will use the same database that the sorter uses, thus ensuring that the data is in the same location
   c. The unique ID assigned to the mail item will be printed on it if manual key-in is desired, and will be the basis for capturing information
   d. The steps would be as follows
      i. User is presented with the image of the envelope, and the information that the system was able to capture
      ii. User is prompted for information that is required/to confirm/change result (in the case of signature verification)
      iii. The updated information is directly saved in the database and associated with the unique ID
      iv. At any time, the envelope could be fed again for sorting/additional operation. On reading the unique ID, the system will take the updated information from the database and use it to make the sort decision
3. Tab removal: Some counties are likely to have a removable tab that covers the signature to protect the privacy of the voter. The sorter could have an inline tab removal device to reduce the effort and time taken for this activity.
4. Reports: Several different types of reports could be generated, based on element information and validation results to meet reporting requirements of customers
5. Data storage: Images of the envelopes could be stored for future reference, named by system generated ID or VRN.

As shown by the above discussion, many of the functions relating to the verifications and sorting operations, for vote-by-mail and similar applications are implemented on one or more computers controlling the reading and sorting elements of a sorter system. The hardware of such computer platforms typically is general purpose in nature, albeit with an appropriate data communication interface or connection for communication with other elements of the sorter system elements and/or for communication via an intranet, the Internet and/or other data networks in the operational manner discussed in detail above.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. In a terminal or workstation type implementation, such as a personal computer (PC) used for the computer 114 or computer 124 in FIG. 2, the computer system also may be coupled to or include a display and one or more user input devices such as alphanumeric and other keys of a keyboard, a mouse a trackball, etc. The display and user input element(s) together form a service-related user interface, for interactive control of the operation of the computer system.

Those skilled in the art will recognize that the operations described above functions relating to the mail item authentication and sorting may be carried out by processing of the data and/or associated execution of software, firmware, or microcode operating on the processors or computers that provide the functionalities of the computers shown in the system drawings. The code for implementing such operations may be in the form of computer instructions in any form (e.g. source code, object code, interpreted code, etc.) stored in or carried by any computer or machine readable medium. Associated data, such as the data representing the prestored signatures of registered voters and the various data relating to other ballot validation criteria similarly may be stored in a database or the like in a wide variety of known data formats.

In operation, the software (executable program code and/or the associated data) is stored within the general-purpose computer platform. At other times, however, the software may be stored at other locations and/or transported for loading into the appropriate general-purpose computer system. For example, it may be desirable to load executable code into one or more of the computers 114, 124 of a sorter from a remote location, to program the sorter system to perform the described processing for a vote-by-mail application. Signature and other validation data that may form the database 120 may be loaded and/or updated from time to time, in the appropriate computer platform.

Program aspects of the technology may be thought of a "products," typically in the form of executable code and/or associated data that is carried on or embodied in a type of medium readable a computer or other machine. Media include any or all of the memory of the computers, processors or the like, or associated modules thereof, such as various semiconductor memories, tape drives, disk drives and the like, which may provide storage at any time for the executable programming and database information. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. Hence, as used herein, terms such as computer or machine "readable medium" refer to any of the media discussed above or any other media that participates in providing instructions to a processor for execution or providing data to the processor for storage or processing or the like.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A single-pass method of authenticating and sorting mail items of a received batch of mail items, the mail items including return envelopes potentially containing ballots for a vote-by-mail election, the method comprising steps of:

in one pass through a sorter system, reading by way of a reader device, each respective mail item in the received batch to acquire data including:

(a) mail item verification information; and (b) a representation of a portion of the respective mail item expected to contain a signature of a sender of the respective mail item;

in the one pass through the sorter system, for each respective mail item in the received batch:

(1) determining whether or not the respective mail item is authentic, by:

(i) determining whether or not the mail item verification information satisfies criteria for an authentic mail item; or (ii) determining based on the item verification information whether or not a ballot has previously been received from a respective registered voter; and (2) determining whether or not an authentic signature is present on the respective mail item, by:

(i) comparing the representation of the portion of the respective mail item expected to contain the signature to a prestored representation of a signature of the respective sender, the prestored representation being stored in a reader database associated with the reader device, and (ii) determining from the comparison whether or not the representation of the portion of the respective mail item sufficiently matches the prestored representation of the signature of the respective sender;

in the one pass through the sorter system, sorting each mail item in the batch determined to be authentic and for which it is determined that an authentic signature is present, into a plurality of sort bins designated for one or more precincts for authenticated mail items; and in the one pass through the sorter system, sorting each mail item in the batch determined to not be authentic, determined to be a duplicate of another mail item, or for which it is determined that an authentic signature is absent, into at least one sort bin designated for mail items that have not been successfully authenticated.

2. The method as in claim 1, wherein:

the mail item verification information read from each respective mail item comprises one or more of:

a color of the respective mail item;

metallic content of the respective mail item;

size and/or shape of the respective mail item;

an alphabetic and/or numeric identifier associated with the election;

a bar code containing an alphabetic and/or numeric identifier associated with the election;

an alphabetic and/or numeric identifier associated with a registered voter; and a bar code containing an alphabetic and/or numeric identifier associated with a registered voter.

3. The method as in claim 1, wherein:

the method further includes, in the one pass through the sorter system, sorting each mail item in the batch determined that the ballot has been previously received from the respective registered voter to one or more bins of the sorter system designated for duplicates.

4. The method as in claim 1, wherein the step of sorting each mail item in the batch determined to not be authentic or for which it is determined that an authentic signature is absent, comprises:

sorting each mail item in the batch determined to not be authentic into a bin designated for rejects; and sorting each mail item in the batch for which it is determined that an authentic signature is absent into a bin designated for further processing.

5. the method according to claim 4, further comprising the step of:

for each mail item sorted into the bin designated for further processing, performing by way of one or more signature verification modules: signature authenticity analysis, penmanship evaluation, or age progression analysis.

6. The method as in claim 1, wherein the step of reading a representation of a portion of the respective mail item comprises capturing an image of a designated region of interest on the respective mail item expected to contain a signature, the region of interest being smaller in area than a panel of the respective mail item expected to contain a signature.

7. The method as in claim 1, wherein the step of reading each respective mail item comprises:

detecting a mail item design of each respective mail item, from a plurality of possible mail item designs; and capturing an image of at least one region of interest on the respective mail item defined for the detected mail item design.

8. The method as in claim 7, wherein the at least one region of interest on the respective mail item defined for the detected mail item design comprises:

a first region of interest corresponding to an area on the respective mail item expected to contain mail item verification information; and a second region of interest corresponding to an area on the respective mail item expected to contain a signature.

9. The method of claim 1, further comprising:

assigning a respective unique mail item identification number to each respective mail item including return envelopes; and tracking processing of each respective mail item based on the respective unique mail item identification number.

10. The method of claim 1, further comprising:

performing the steps on another batch of mail items in one pass through another sorter system; and communicating data used in or resulting from one or more of the processing steps between the sorters via a data communication network.

11. The method of claim 10, wherein the data communicated between the sorter systems comprises shared reference data used in one or more of the determining steps.

12. The method of claim 10, wherein the data communicated between the sorter systems comprises information regarding mail items processed through each of the sorter systems.

13. The method of claim 12, further comprising recognizing a duplicate mail item based on verification information from the duplicate and the information regarding mail items processed through each of the sorter systems.

14. A sorter system configured to perform the steps of the method of claim 1.

15. A product comprising a program for a control computer of a sorter system for configuring the sorter system to perform the steps of the method of claim 1, a database of prestored representations of signatures of potential senders, and at least one computer readable medium bearing the program and the database.

16. The method as in claim 1, wherein the precinct is an electoral district or area.

17. The method according to claim 1, further comprising the step of:

in the one pass through the sorter system, determining one of a plurality of precincts for each mail item in the batch determined to be authentic and for which it is determined that an authentic signature is present, wherein, the sorting of each mail item into the plurality of sort bins designated for authenticated mail items being performed based on the determined precincts responsive to the precinct determining step.

18. A single-pass method of authenticating and sorting mail items of a received batch of mail items, the mail items including return envelopes potentially containing ballots for a vote-by-mail election, the method comprising steps of:

in one pass through a sorter system, reading by way of a reader device, each respective mail item in the received batch to acquire data including:

(a) mail item verification information; and (b) a representation of a portion of the respective mail item expected to contain a signature of a sender of the respective mail item;

in the one pass through the sorter system, for each respective mail item in the received batch:

(1) determining whether or not the respective mail item is authentic, by:

(i) determining whether or not the mail item verification information satisfies criteria for an authentic mail item; and (ii) determining based on the item verification information whether or not a ballot has previously been received from a respective registered voter; and (2) determining whether or not an authentic signature is present on the respective mail item, by:

(i) comparing the representation of the portion of the respective mail item expected to contain the signature to a prestored representation of a signature of the respective sender, the prestored representation being stored in a reader database associated with the reader device, and (ii) determining from the comparison whether or not the representation of the portion of the respective mail item sufficiently matches the prestored representation of the signature of the respective sender;

in the one pass through the sorter system, sorting each mail item in the batch determined to be authentic and for which it is determined that an authentic signature is present, into a plurality of sort bins designated for one or more precincts for authenticated mail items; and in the one pass through the sorter system, sorting each mail item in the batch determined to not be authentic, determined to be a duplicate of another mail item, or for which it is determined that an authentic signature is absent, into at least one sort bin designated for mail items that have not been successfully authenticated, wherein:

the step of reading a representation of a portion of the respective mail item comprises capturing an image of a designated region of interest on the respective mail item expected to contain a signature, the region of interest being smaller in area than a panel of the respective mail item expected to contain a signature, and the step of comparing the representation of the portion of the respective mail item expected to contain the signature to a prestored representation of a signature of the respective sender comprises:

normalizing the captured image of the designated region of interest of the respective mail item; and comparing the normalized image to the prestored representation of the signature of the respective sender.

19. The method according to claim 18, further comprising the step of:

in the one pass through the sorter system, determining one of a plurality of precincts for each mail item in the batch determined to be authentic and for which it is determined that an authentic signature is present, wherein, the sorting of each mail item into the plurality of sort bins designated for authenticated mail items being performed based on the determined precincts responsive to the precinct determining step.

20. A single-pass method of processing return envelopes potentially containing ballots for a vote-by-mail election, the method comprising steps of:

during a single pass through a sorter system, determining from a first sensed characteristic of each respective one of the envelopes whether or not the respective envelope exhibits a valid relationship to the election;

during the single pass through the sorter system, determining from a second sensed characteristic of each respective one of the envelopes whether or not the respective envelope exhibits a valid relationship to a voter registered to vote in the election;

during the single pass through the sorter system, sorting envelopes determined to not exhibit the valid relationship to the election into a first group of ballots to be sorted to one or more designated bins;

during the single pass through the sorter system, determining one of a plurality of precincts, for each envelope determined to exhibit both the valid relationship to the election and the valid relationship to a voter registered to vote in the election;

during the single pass through the sorter system, sorting envelopes determined to exhibit the valid relationship to the election but not exhibit the valid relationship to a voter registered to vote in the election, into a second group of ballots to be sorted to the one or more designated bins;

during the single pass through the sorter system, sorting envelopes determined to exhibit both the valid relationship to the election and the valid relationship to a voter registered to vote in the election into a third group of ballots to be sorted to the one or more designated bins;

the step of sorting each envelope determined to exhibit both the valid relationship to the election and the valid relationship to a voter registered to vote in the election sorts envelopes into a fourth group of ballots to be sorted by precinct to the one or more designated bins; and during the single pass through the sorter system, determining if an envelope is a duplicate of another envelope previously received with respect to a vote by one of the registered voters and sorting these envelopes into a fifth group to be sorted to the one or more designated bins.

21. The method as in claim 20, wherein the sorting of envelopes into the third group of designated bins is performed based on a third sensed characteristic different from the first and second characteristics.

22. The method of claim 20, wherein the step of determining from the first sensed characteristic of each respective one of the envelopes whether or not the respective envelope exhibits a valid relationship to the election comprises:

reading each respective one of the envelopes;

capturing information about each respective one of the envelopes based on the reading of each respective one of the envelopes; and comparing the captured information about each respective one of the envelopes to one or more election related criteria.

23. The method of claim 22, wherein the election related criteria comprises one or more of:

a color used for a mailing related to the election;

degree of metallic content;

size and/or shape of a mailing related to the election; and an alphabetic and/or numeric identifier associated with the election.

24. The method of claim 20, wherein the step of determining from the second characteristic of each respective one of the envelopes whether or not the respective envelope exhibits a valid relationship to a voter registered to vote in the election comprises:

reading each respective one of the envelopes;

capturing information about each respective one of the envelopes based on the reading of each respective one of the envelopes; and comparing the captured information about each respective one of the envelopes to one or more criteria related to voters registered to vote in the election.

25. The method of claim 24, wherein the election related criteria comprises one or more of:

alphabetic and/or numeric identifiers associated with the voters registered to vote in the election;

criteria for determining presence of a signature; and prestored signatures of the voters registered to vote in the election.

26. The method of claim 20, wherein the step of determining from the second characteristic of each respective one of the envelopes whether or not the respective envelope exhibits a valid relationship to a voter registered to vote in the election comprises:

reading the respective envelope to capture information identifying a respective voter registered to vote in the election;

reading a region of interest on the respective envelope to determine whether or not the region of interest contains a signature;

upon determining that the region of interest on the respective envelope contains the signature, comparing the signature to a prestored signature of the identified registered voter; and determining that the respective envelope exhibits the valid relationship to the identified registered voter when the signature contained in the region of interest on the respective envelope sufficiently matches the prestored signature of the identified registered voter.

27. The method of claim 26, wherein the step of reading the respective envelope to capture information identifying a respective voter comprises scanning the respective envelope to detect one or more of:

a voter registration number;

a voter address;

a voter name; and a bar code containing one or more of a voter registration number, a voter address and a voter name.

28. The method of claim 20, further comprising:

assigning a respective unique identification number to each respective envelope; and tracking processing of each respective envelope based on the respective unique identification number.

29. The method of claim 20, further comprising:

performing the steps on another batch of envelopes in one pass through another sorter system; and communicating data used in or resulting from one or more of the processing steps between the sorters via a data communication network.

30. The method of claim 29, wherein the data communicated between the sorter systems comprises shared reference data used in one or more of the determining steps.

31. The method of claim 29, wherein the data communicated between the sorter systems comprises information regarding envelopes processed through each of the sorter systems.

32. The method of claim 31, further comprising recognizing a duplicate envelope based on information obtained from one of the sensed characteristics of the duplicate and the information regarding envelopes processed through each of the sorter systems.

33. A sorter system configured to perform the steps of the method of claim 20.

34. A product comprising a program for a control computer of a sorter system for configuring the sorter system to perform the steps of the method of claim 20, and at least one computer readable medium bearing the program.

35. The method of claim 20, wherein the precinct is an electoral district or area.

* * * * *